Patented Mar. 22, 1949

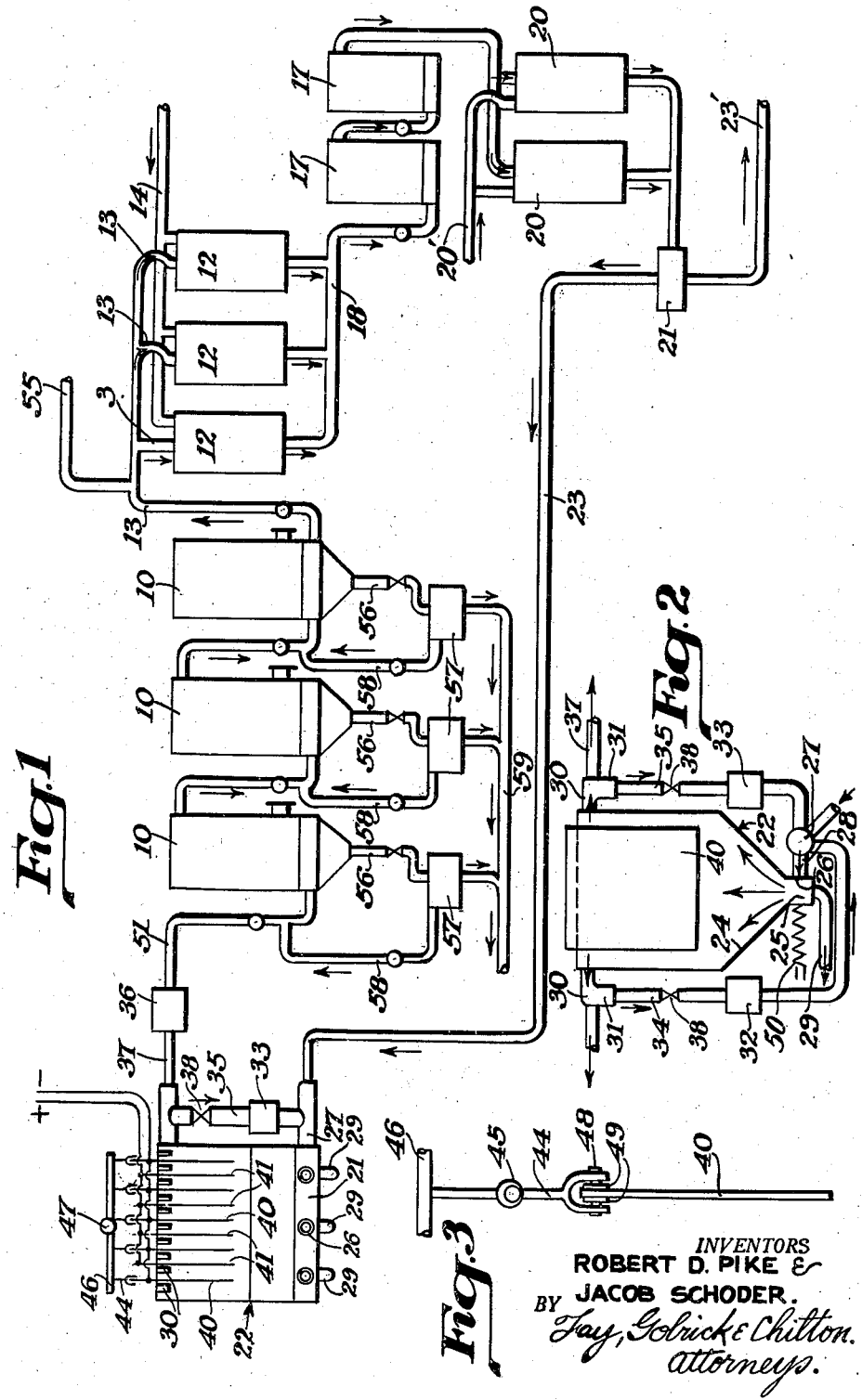

2,464,889

UNITED STATES PATENT OFFICE 2,464,889

PROCESS FOR MAKING ELECTROLYTIC IRON

Robert D. Pike, Pittsburgh, Pa., and Jacob Schoder, Portland, Oreg., assignors, by mesne assignments, to Tacoma Powdered Metals Company, Inc., Tacoma, Wash., a corporation of Washington Application March 19, 1945, Serial No. 583,474

7 Claims. (Cl. 204—10)

The present invention relates to a method for electrodepositing iron, and more particularly to a method of recovering iron in a non-reguline form from scrap materials and the like, by electrodepositing the iron from an electrolyte in which iron containing scrap material and the like has been leached.

An object of the present invention is to produce iron of high purity in non-reguline form in a simple non-diaphragm electrolytic cell with insoluble anodes from an electrolyte consisting of a mixture of ferric chloride and ferrous chloride circulated into contact with the cathode. The iron so produced contains hydrogen which renders it granular and brittle whereby it is easily stripped from the cathode and ground to a fine powder suitable for use in the art of powder metallurgy in which metallic powders are compressed into various useful forms and are then sintered in a furnace with a reducing atmosphere, making objects of good strength and high porosity.

Another object of the invention is to provide, in a system for the recovery of iron by electrodepositing the iron in a simple non-diaphagm cell with insoluble anodes from an electrolyte containing iron leached from iron containing material outside the cell, a method of treatment by which the electrolyte may be clarified and used repeatedly in the system.

Still another object of the invention is to provide a method of removing the electrodeposited material from the cathodes of the electrolytic cell without interrupting the electrodepositing operation.

A further object of the invention is to provide a method of electrodepositing iron in which the quantity of iron deposited in a simple non-diaphragm cell with insoluble anodes and in the presence of substantial concentrations of ferric iron per ampere hour is relatively great, showing a current efficiency in excess of 75%.

Other objects and advantages of the invention will be apparent from the following description of one embodiment of the invention, reference being had to the accompanying drawings wherein:

Fig. 1 is a diagrammatic illustration of a system for the recovery of iron in non-reguline form from scrap iron and steel material, sponge iron and the like;

Fig. 2 is a diagrammatic illustration of an end view of an electrolytic cell, the side view of which cell is shown in Fig. 1; and Fig. 3 is a side view in elevation of a cathode for the electrolytic cell.

Referring to Fig. 1 of the drawings, there is shown, in a more or less diagrammatic form, a system for recovering iron from scrap iron and steel, sponge iron or the like, by leaching iron from such material by a solution of ferric chloride and subsequently electrodepositing the dissolved iron on the cathodes of an electrolytic cell, without diaphragms and with insoluble anodes.

In carrying out the invention, iron-containing material, such as stampings and turnings, for example, is placed in primary leaching tanks 10. Electrolytic cell effluent containing approximately .75 to 1.00% $Fe^{+++}$ as ferric chloride and 10 to 12% total Fe as chloride and having a pH of 1.20 to 1.50 and a temperature of between 85° to 95° F. is then directed into these tanks, completely engulfing the scrap, and flowing upwardly through it. This solution is contained in the tanks for a period of eight hours, more or less, depending on the form of iron in the tanks, until the $Fe^{+++}$ is reduced to .05% or less and the pH is raised to approximately 1.90 to 2.10. A brown precipitate is formed in the solution, which precipitate is probably ferric oxychloride, FeOCl and which is generally in the amount of .10 to .15% of the electrolyte. It is desirable to dissolve this precipitate as it interferes with proper electrodeposition of the iron in the electrolytic cell. To remove the iron oxychloride, the leaching solution or electrolyte is next directed into holding tanks 12 through pipes 13. Commercial hydrochloric acid is added to the holding tanks through conduits 14 and this mixture is agitated in the tanks by suitable mechanism, not shown. Preferably, each tank 12 is designed to hold all of a flow from the leaching tanks for a period of not less than twelve hours. Three such tanks are shown herein, so that sufficient solution may be undergoing treatment to furnish a continuous flow to the electrolytic cell to be described hereinafter. An amount of hydrochloric acid is added to reduce the pH of the solution to approximately 1.3 to 1.4. This dissolves the iron oxychloride.

At this point it is desirable to make an analysis of the electrolyte to determine the amount of $Fe^{+++}$, total Fe, and foreign metals, such as Mn.

The electrolyte is then passed into secondary leaching tanks 17, through a conduit 18. The leaching tanks 17 contain iron scrap, and the electrolyte is retained in contact with such scrap until the pH thereof is raised to 2.00 to 2.15. There will be no precipitation occurring in these tanks.

The next step is to remove any oily matter from the electrolyte which may have been picked up from the scrap. To accomplish this, we prefer to direct the electrolyte from tanks 17 into agitation tanks 20 in which activated carbon or some other suitable adsorbent may be added by conduit 20'. After agitation, the electrolyte is then passed through a suitable filter, indicated at 21, for removing the adsorbent therefrom, and it is then conducted to a non-diaphragm electrolytic cell 22 through conduit 23. Excess electrolyte, if present, may be directed to a suitable reservoir, not shown, through conduit 23' for future use.

The cell 22 may be formed of a pitch lined metal container 24 having the lower portion thereof sloping inwardly to form a trough 25, the trough 25 preferably being of exposed steel, at least to a sufficient extent to provide electrical contact with any electrolytic iron which may have fallen from the cathodes. A series of inlets 26 are formed in the trough 25, which inlets are connected with a mixing manifold 27 by tubes 28. One or more outlets 28 are provided in the bottom of the trough 25, which outlets are provided with suitable valves, not shown, for controlling the flow therethrough. The purpose of the outlets will be more fully explained hereinafter. Adjacent to the top of the container 24 and along opposite sides thereof are a plurality of overflow weirs 30 which empty into longitudinally extending launders 31. The launders empty into the inlets of two circulating pumps, indicated at 32 and 33, through conduits 34 and 35, and also into a heat exchanger 36 through a conduit 37. Preferably, valves 38 are provided in the conduits 34 and 35 for controlling the flow through the pumps 32 and 33. The pumps 32 and 33 discharge into the manifold 27. Thus, spent electrolyte flowing from the top of the cell is divided, part going to the pumps for recirculation into the cell, intermingled with electrolyte from conduit 23, and part of the spent electrolyte flows to the heat exchanger 36 and to the leaching tanks 10. Preferably, the speed of the pumps 32 and 33 is regulatable for controlling the volume of the electrolyte to be recirculated.

A plurality of cathodes 40 and anodes 41 are suspended in the container 24 from above the top thereof. The anodes 41, which are preferably formed of graphite, may be suspended in any suitable manner, but we prefer to suspend the cathodes 40, which consist of plates formed of 18-8 stainless steel, by forked members 44, one of which is shown in Fig. 3. The member 44 is pivoted at 45 and the upper end thereof is connected to a bar 46 which is adapted to be rapidly reciprocated longitudinally during operation of the cell by a vibrator 47, whereby rapid vibration is imparted to the cathodes 40 for causing the loosely adhering particles of iron to drop therefrom and collect in the trough 25. The forked end of the member 44 is connected to the cathodes by a pin 48 and washers 49 are interposed between the cathode and the arms of the fork. Thus, the iron may be removed from the cathodes without interrupting operation of the cell.

In order to prevent the re-solution of the deposited iron in the trough 25 and to minimize further deposition of iron we provide an adjustable resistance 50 connected with the trough 25 and to the negative bus bar (not shown), whereby a negative charge may be placed on the iron. The iron so collected may be withdrawn from time to time, through the outlet pipes 29, the iron being filtered from the electrolyte and the latter subsequently being returned to the system.

It is to be understood, however, that it is not necessary to remove the iron from the cathode by the method just described, as the cathodes may be removed from the cell periodically and the iron scraped therefrom.

The heat exchanger 36 is adapted to cool the effluent electrolyte directed thereto to a temperature of between 85° to 95° F., as the electrolyte will ordinarily be at a higher temperature on leaving the cell. From the heat exchanger the electrolyte is conducted to the leach tanks 10 through conduit 51. The pH value of this effluent electrolyte will range from 1.20 to 1.50 and there will be approximately .75 to 1.00% $Fe^{+++}$ as ferric chloride and preferably to 10 to 12% total Fe as chloride.

In the operation of the system, the cathodes and anodes are connected to the negative and positive poles, respectively, of a suitable source of unidirectional current for producing a current density of approximately 50 amperes per square foot, requiring a voltage of from 5.5 to 6.0. The electrolyte containing ferrous chloride enters the cell through inlets 26 and it is intermingled with the cell effluent containing ferric chloride from the overflow of the top of the cell. The quantity of recirculated electrolyte is approximately equal to the quantity of fresh, incoming electrolyte so that the cathodes will be in contact throughout their entire surfaces with a substantial concentration of ferric chloride, ranging from .4% Fe as ferric chloride at the cell bottom to 1.00-1.5% at the overflow wiers, we have found that this contact of the cathodes with ferric iron produces a nonreguline easily removable deposit of the type desired, which when scraped or shaken from the cathodes is in the form of brittle particles of iron hydride. In any event, the percentage of Fe as ferric chloride in the cell and about the cathodes should fall within the limits of from .40 at the inlet to 1.5% as a maximum at the overflow wiers.

From time to time it may be desirable to purify the electrolyte in the system by the removal of Mn and similar metals which may be dissolved in the electrolyte. For this purpose, electrolyte may be bled from the system by conduit 55, after which the electrolyte is treated chemically to remove the impurities, after which it is returned to the system.

The leach tanks 10 may be cleaned by draining the contents thereof, after leaching has occurred, through conduits 56 into filters 57. The filtered electrolyte may be returned to the leach tanks through pipes 58, or it may be directed to a recovery reservoir, not shown, through conduit 59.

We believe that the principal cyclic reactions which occur in the cell are the following:

(1) $3FeCl_2 = Fe + 2FeCl_3$
(3) $6FeCl_2 + 6FeCl_3 + 6H_2O = 6FeOCl + 6FeCl + 12HCl + 6Cl$
(4) $6Cl + 6FeCl_2 = 6FeCl_3$
(5) $6FeCl = 3Fe + 3FeCl_2$

The reactions in the leach tanks 10 and tanks 12 are as follows:

(2) $2FeCl_3 + Fe = 3FeCl_2$
(6) $6FeOCl + 3Fe + 12HCl = 9FeCl_2$

Thus $12FeCl_2$ is produced in dissolving 4Fe in the leach tanks using up $2FeCl_3$, $6FeOCl$ and 12HCl. In the cell 4Fe is electrodeposited, three from the mono-valent state and one from the di-valent state, giving an average deposition according to Faraday's law of 1.82 grams per ampere hour; also 6FeOCl, 12HCl and 2FeCl₃ are produced. 6Cl is produced as an intermediate which with 6FeCl₂ make the FeCl₃ needed in Equation 3 which also uses the other 6FeCl₂ of the 12 total made in the leach. Thus the process is fully cyclic and 8Fe$^{+++}$ is produced in the cell (Fe in FeOCl is in the ferric condition), for 4Fe deposited which is the same ratio of 2/1 noted in Equations 1 and 2.

Thus, although Equation 1 which deposits Fe from the di-valent state giving 1.04 grams per ampere hour at 100% current efficiency, operates at a low current efficiency because of chemical re-solution of iron on the cathode by Equation 2, the series (1), (3), (4), (5) compensate for this by depositing 75% of the total Fe from the mono-valent state and 25% from the di-valent state, giving an average deposition of 1.82 grams per ampere hour.

We have shown above that the normal production of Fe$^{+++}$ in the cell is twice that of the iron deposited, but in actual practice it is considerably greater than this, running from 2.5 to 2.9. We explain this by assuming the electrolysis of some of the HCl in the cell and possibly also by the electrolysis of water. This in turn follows upon the fact that we ordinarily use a current density of about 50 amperes per square foot requiring a cell voltage of about 5.5–6.0 which is more than enough to electrolyze either HCl or water.

The equations involved follow:

*Electrolysis of Water*

In the cell:
(7) $2H_2O = 4H + 2O$
(8) $2FeCl_2 + 2O = 2FeOCl + 2Cl$
(4) $2FeCl_2 + 2Cl = 2FeCl_3$ In the leach:
(2) $2FeCl_3 + Fe = 3FeCl_2$

*Electrolysis of HCl*

In the cell:
(9) $6HCl = 6H + 6Cl$
(4) $6Cl + 6FeCl_2 = 6FeCl_3$

In the leach:
(2) $6FeCl_3 + 3Fe = 9FeCl_2$ (3 net).

In both of the above series of equations involving the electrolysis of water and HCl the principal characteristic is the formation of ferric iron in the cell without any corresponding deposition of iron. Each hydrogen ion at the cathode gives rise to (1) ferric ion in solution, and the net result is the production of FeCl₂ in the leach tank. This has the useful function of making up for losses of electrolyte which are relatively high in our process because of the frequent removal of the cathodes themselves or of iron from the cell bottoms, in each case the iron containing about 13% of electrolyte, much of which is lost.

We believe that an important role played by Fe$^{+++}$ throughout the cell, brought about by recirculation, is its function of producing HCl and FeOCl by hydrolysis. This creates a low enough pH to keep the FeOCl in solution as a complex which is consistent with the fact that the electrolyte in the cell is clear. It also brings about the environment for the formation of the mono-valent compound FeCl which we refer to as sub-ferrous chloride.

We are well aware that there is no conclusive evidence in the literature to prove the existence of FeCl, but we have adopted its existence as a well supported hypothesis underlying the process of our present invention because it alone can be relied upon to reconcile all of the observed data.

As we conceive the mechanism of the reaction, the FeCl occurs only as a transient component in the cell, carrying the current and being immediately decomposed in accordance with Equation 5. This immediate electrolytic decomposition of FeCl in preference to FeCl₂ is in accord with the unstable nature of the former. The net result is the deposition of more iron per ampere hour because, according to Faraday's law, twice as much iron per ampere hour will be deposited from mono-valent than from di-valent compounds.

Furthermore, the high acidity of the electrolyte in the cell in our process promotes electrolysis of HCl which increases the deposition of H with the iron which tends to make the deposit non-reguline, brittle and easily removed and easily ground.

The electrolysis of HCl also increases the oxidizing power of the cell effluent by creating Fe$^{+++}$ without corresponding deposition of iron, and this results in adding FeCl₂ in the leaching tanks which act to compensate for losses of electrolyte.

We are well aware that no sound basis has hitherto been described in the literature to support the existence of mono-valent iron, although this has been suspected by some authorities, and the evidence advanced herein is only designed to support its existence as a transient, or temporary component. This is rendered possible in the first place by the well known tendency of FeCl₃ to promote hydrolysis and to lower pH, and is supported by the fact that FeCl, once having been formed, the entire current would be expected to be carried by mono-valent iron rather than by di-valent iron in following the path of least resistance.

Thus by recirculating ferric chloride to the cell feed insuring a substantial concentration of ferric iron in contact with the cathodes, we bring about a condition which, first, promotes hydrolysis, forming HCl and a soluble complex of the probable empirical formula FeOCl; second, creating the transient formation of mono-valent iron as FeCl which carries the current to deposit twice as much iron per ampere hour as from di-valent iron in accordance with Faraday's law. This extra deposition of iron counteracts to some extent the tendency of ferric chloride when in contact with the cathodes to redissolve the deposited iron by chemical solution.

The electrolysis of water in the cell has been shown by Equation 8 to produce the complex FeOCl in solution in the electrolyte. This is precipitated as a murky, yellow-brown finely divided substance in the primary leach tanks because no HCl is produced to cause Equation 6 to function. In a similar manner the HCl electrolyzed in accordance with Equation 9 robs Equation 6 of the necessary HCl, and an equivalent amount of FeOCl to the lost HCl is precipitated in the primary leach tank at a pH above 1.75.

When the FeOCl precipitated in the primary leach tank is redissolved by lowering pH by addition of HCl, we believe that it goes into solution as a complex and is not decomposed by the acid in the ordinary sense. Nor is it re-precipitated when the pH is raised by a second contact with scrap iron or steel in the so-called secondary leach. We attribute this phenomenon to the fact that in the primary leach the amount of FeOCl present is much greater than in the secondary leach. In the primary leach there is present all of the FeOCl necessary for Equation 6 to function, whereas this is absent in the secondary leach in which the amount of FeOCl present is only of the order of .15% of the electrolyte, whereas in the primary leach at least three times as much is present.

The following is a typical summary of the operating characteristics of our system wherein iron was recovered from punchings and borings.

| | |
|---|---|
| Cathodic current density, amps. per sq. ft. | 50.5 |
| Anodic current density, amps. per sq. ft. | 50.0 |
| Temperature cell feed, °F. | 71.4 |
| $Fe^{+++}$ in cell effluent, per cent | .79 |
| Recirculation of cell effluent to cell feed, expressed as percentage of net feed | 91.2 |
| Total Fe as chloride | 11.45 |
| pH cell feed | 2.12 |
| Grams iron deposited, per ampere hour | .82 |
| $Fe^{+++}$ produced in cell, per lb. Fe deposited | 2.89 |
| Net flow of electrolyte, lbs. per lb. Fe deposited | 367 |
| Gross flow electrolyte in cell, lbs. per lb. iron deposited | 700 |
| Temperature cell effluent, °F. | 88.6 |
| pH cell effluent | 1.50 |
| Kw. hours per lb. iron deposited measured at cells | 3.07 |
| Commerical hydrochloric acid containing 31.52% HCl consumed, lbs. per lb. iron deposited | .85 |

Thus, it is apparent that we have provided a method for recovering iron from scrap sponge iron or the like by the electrodeposition of iron, which iron is deposited in a highly useful form. Also, the amount of iron deposited is relatively great, considering the current consumption required. The process may be continued for indefinite periods, thereby yielding a high recovery of iron at an economical cost.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. The method of producing a granular brittle electrolytic iron in a non-diaphragm electrolytic cell with an insoluble anode, which comprises, electrodepositing iron on a cathode in said cell from an aqueous iron chloride electrolyte in contact with both said anode and said cathode and having a total iron content between approximately 10% and 12% of said electrolyte by weight with a cathode current density of approximately 50 amperes per square foot whereby the ferric iron content of said electrolyte increases and the pH of said electrolyte decreases, maintaining said electrolyte at a temperature of about 85-95° F., removing electrolyte from said cell when the ferric iron content is between approximately .75% and 1.5% of said electrolyte and the pH of said electrolyte is between approximately 1.2 and 1.5, and supplying to said cell a mixture of an aqueous ferrous chloride solution having a ferric iron content below approximately .05% and a pH between approximately 2.0 and 2.15 and a sufficient amount of said removed electrolyte to provide a ferric iron content above approximately .4%, said aqueous ferrous chloride solution having a concentration providing said total iron content in said cell.

2. The method of producing a granular brittle electrolytic iron in a non-diaphragm electrolytic cell with an insoluble anode, which comprises, electrodepositing iron on a cathode in said cell from an aqueous iron chloride electrolyte in contact with both said anode and said cathode and having a total iron content between approximately 10% and 12% of said electrolyte by weight whereby the ferric iron content of said electrolyte increases and the pH of said electrolyte decreases, maintaining said electrolyte at a temperature of about 85-95° F., removing electrolyte from the top of said cell when the ferric iron content is between approximately .75% and 1.5% of said electrolyte and the pH of said electrolyte is between approximately 1.2 and 1.5, and simultaneously supplying to the bottom of said cell a mixture of an aqueous ferrous chloride solution having a ferric iron content below approximately .05% and a pH between approximately 2.0 and 2.15 and a sufficient amount of said removed electrolyte to provide a ferric iron content above approximately .4%, said aqueous ferrous chloride solution having a concentration providing said total iron content in said cell.

3. The method of producing a granular brittle electrolytic iron in a non-diaphragm electrolytic cell with an insoluble anode, which comprises, electrodepositing iron on a cathode in said cell from an aqueous iron chloride electrolyte in contact with both said anode and said cathode and having a total iron content between approximately 10% and 12% of said electrolyte by weight whereby the ferric iron content of said electrolyte increases and the pH of said electrolyte decreases, maintaining said electrolyte at a temperature of about 85-95° F., removing electrolyte from said cell when the ferric iron content is between approximately .75% and 1.5% of said electrolyte and the pH of said electrolyte is between approximately 1.2 and 1.5, contacting iron with a portion of said removed electrolyte to reduce the ferric iron content thereof to below approximately .05% while increasing the ferrous iron content and the pH and producing a brown precipitate in the solution, discontinuing the contacting of iron and acidifying the resulting solution with sufficient hydrochloric acid to dissolve said precipitate and decreasing the pH, thereafter contacting iron with the acidified solution to produce a pH between approximately 2.0 and 2.15 and increase the ferrous iron content without forming a precipitate to form a regenerated ferrous chloride solution, mixing the regenerated solution with another portion of said removed electrolyte to provide a ferric iron content above approximately .4% and said total iron content and returning the same to said cell.

4. The method of producing a granular brittle electrolyte iron in a non-diaphragm electrolytic cell with an insoluble anode, which comprises, electrodepositing iron on a cathode in said cell from an aqueous iron chloride electrolyte in contact with both said anode and said cathode and having a total iron content between approximately 10% and 12% of said electrolyte by weight whereby the ferric iron content of said electrolyte increases and the pH of said electrolyte decreases, maintaining said electrolyte at a temperature of about 85-95° F., removing electrolyte from said cell when the ferric iron content is between approximately .75% and 1.5% of said electrolyte and the pH of said electrolyte is between approximately 1.2 and 1.5, contacting iron with a portion of said removed electrolyte to reduce the ferric iron content thereof to below approximately .05% while increasing the ferrous iron content and the pH and producing a precipitate of ferric oxychloride, discontinuing the contacting of iron when the pH of the resulting solution is between approximately 1.9 to 2.1, acidifying the resulting solution with hydrochloric acid to dissolve said precipitate and produce a pH between approximately 1.3 to 1.4, thereafter contacting iron with the acidified solution to increase the pH to between approximately 2.0 and 2.15 and increase the ferrous iron content without forming a precipitate to form a regenerated ferrous chloride solution, mixing the regenerated solution with another portion of said removed electrolyte to provide a ferric iron content above approximately .4% and said total iron content and returning the same to said cell.

5. The method of producing a granular brittle electrolytic iron in a non-diaphragm electrolytic cell with an insoluble anode, which comprises, electrodepositing iron on a cathode in said cell from an aqueous iron chloride electrolyte in contact with both said anode and said cathode and having a total iron content between approximately 10% and 12% of said electrolyte by weight with a current density of approximately 50 amperes whereby the ferric iron content of said electrolyte increases and the pH of said electrolyte decreases, maintaining said electrolyte at a temperature of about 85–90° F., removing electrolyte from said cell when the ferric iron content is between approximately .75% and 1.5% of said electrolyte and the pH of said electrolyte is between approximately 1.2 and 1.5, contacting iron with a portion of said removed electrolyte to reduce the ferric iron content thereof to below approximately .05% while increasing the ferrous iron content and the pH and producing a precipitate of ferric oxychloride, discontinuing the contacting of iron when the pH of the resulting solution is between approximately 1.9 to 2.1, acidifying the resulting solution with hydrochloric acid to dissolve said precipitate and produce a pH between approximately 1.3 to 1.4, thereafter contacting iron with the acidified solution to increase the pH to between approximately 2.0 and 2.15 and increase the ferrous iron content without forming a precipitate to form a regenerated ferrous chloride solution, mixing the regenerated solution with another portion of said removed electrolyte to provide a ferric iron content above approximately .4% and said total iron content and returning the same to said cell.

6. In a method of producing granular brittle electrolytic iron in a non-diaphragm electrolytic cell with an insoluble anode by electrodepositing iron on a cathode in said cell from an aqueous iron chloride electrolyte in contact with both said anode and said cathode, the steps which comprise, maintaining said electrolyte at a temperature of about 85–90° F., removing electrolyte from one portion of said cell having a total iron content between approximately 10% and 12% of the removed electrolyte by weight, a ferric iron content between approximately .75% and 1.5% and a pH between approximately 1.2 and 1.5, contacting iron with a portion of said removed electrolyte to reduce the ferric iron content thereof to below approximately .05% while increasing the ferrous iron content and the pH and producing a brown precipitate in the solution, discontinuing the contacting of iron and acidifying the resulting solution with sufficient hydrochloric acid to dissolve said precipitate and decreasing the pH, thereafter contacting iron with the acidified solution to produce a pH between approximately 2.0 and 2.15 and increase the ferrous iron content without forming a precipitate to form a regenerated ferrous chloride solution, mixing the regenerated solution with another portion of said removed electrolyte to provide a ferric iron content above approximately .4% and said total iron content and returning the same to said cell.

7. In a method of producing granular brittle electrolytic iron in a non-diaphragm electrolytic cell with an insoluble anode by electrodepositing iron on a cathode in said cell from an aqueous iron chloride electrolyte in contact with both said anode and said cathode, the steps which comprise, maintaining said electrolyte at a temperature of about 85–90° F., removing electrolyte from one portion of said cell having a total iron content between approximately 10% and 12% of the removed electrolyte by weight, a ferric iron content between approximately .75% and 1.5% and a pH between approximately 1.2 and 1.5, contacting iron with a portion of said removed electrolyte to reduce the ferric iron content thereof to below approximately .05% while increasing the ferrous iron content and the pH and producing a precipitate of ferric oxychloride, discontinuing the contacting of iron when the pH of the resulting solution is between approximately 1.9 to 2.1, acidifying the resulting solution with hydrochloric acid to dissolve said precipitate and produce a pH between approximately 1.3 to 1.4, thereafter contacting iron with the acidified solution to increase the pH to between approximately 2.0 and 2.15 and increase the ferrous iron content without forming a precipitate to form a regenerated ferrous chloride solution, mixing the regenerated solution with another portion of said removed electrolyte to provide a ferric iron content above approximately .4% and said total iron content and returning the same to said cell.

ROBERT D. PIKE.
JACOB SCHODER.

REFERENCES CITED

The following references are of record in the file of this patent:

UNITED STATES PATENTS

| Number | Name | Date |
|---|---|---|
| 522,415 | Huber | July 3, 1894 |
| 1,254,056 | Moore | Jan. 22, 1918 |
| 1,432,544 | Eustis et al. | Oct. 17, 1922 |
| 1,769,605 | Pike | July 1, 1930 |
| 1,782,909 | Pike | Nov. 25, 1930 |
| 1,912,430 | Cain | June 6, 1933 |
| 1,945,107 | Cain | Jan. 30, 1934 |
| 1,980,381 | Cain | Nov. 13, 1934 |
| 2,223,928 | Whitfield et al. | Dec. 3, 1940 |
| 2,273,798 | Heise et al. | Feb. 17, 1942 |

FOREIGN PATENTS

| Number | Country | Date |
|---|---|---|
| 506,590 | Great Britain | May 30, 1939 |
| 549,954 | Great Britain | Dec. 15, 1942 |